Sept. 15, 1925.

W. U. SMITH

GARDEN TRACTOR

Filed Jan. 3, 1922

INVENTOR

Walter U. Smith

BY

ATTORNEY

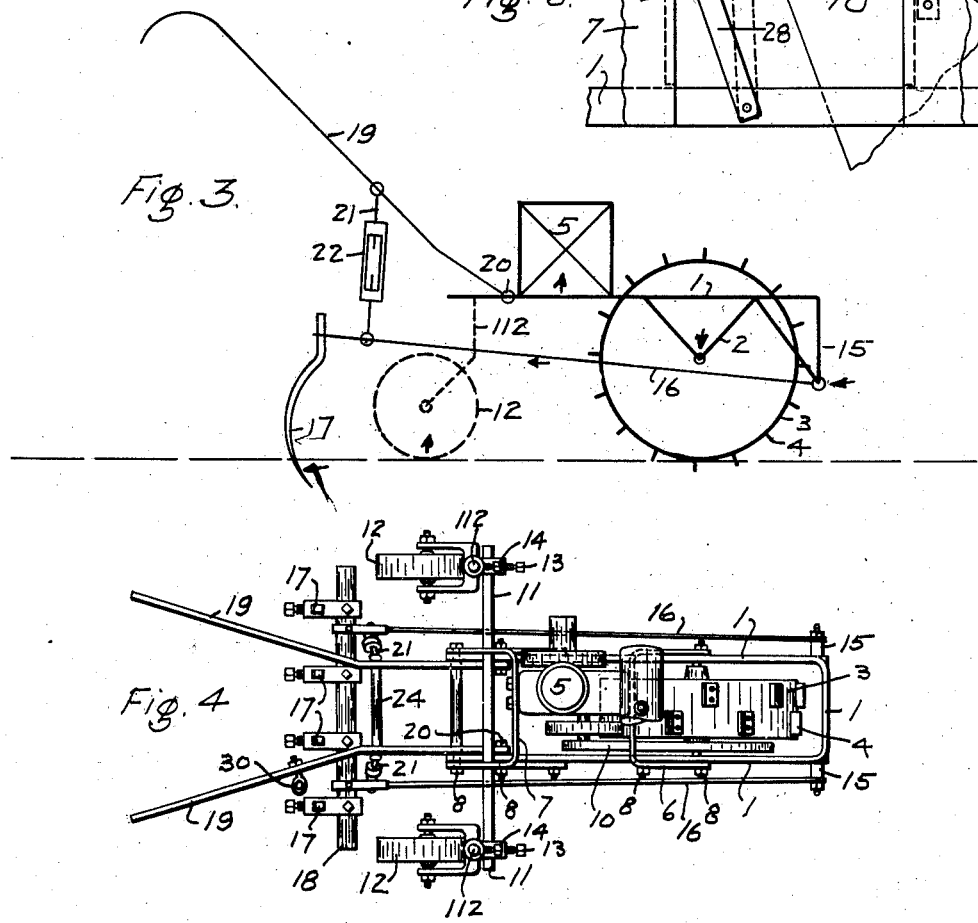

Patented Sept. 15, 1925.

1,553,919

UNITED STATES PATENT OFFICE.

WALTER U. SMITH, OF TACOMA, WASHINGTON.

GARDEN TRACTOR.

Application filed January 3, 1922. Serial No. 526,648.

*To all whom it may concern:*

Be it known that I, WALTER U. SMITH, a citizen of the United States, residing at Tacoma, in the county of Pierce, State of Washington, have invented certain new and useful Improvements in Garden Tractors, of which the following is a specification.

This invention relates to small tractors for use in garden tracts, estates, parks, lawns and other similar places and is adapted to drag small plows or other cultivating tools, or to push lawn mowers, and has for its objects to produce a machine which can be easily handled, guided and operated by one person; in which the power is applied in such manner that the drag of the plow or other agricultural implement will increase the grip of the tractor wheel on the ground; in which the machine can be handled without running the motor; in which the machine can turn on a very short radius; in which the driving parts can be adjusted in position in order to tighten the drive belt or chain or to increase the tractive force.

I attain these and other objects by means of the devices, mechanisms, and arrangements illustrated in the accompanying drawings, in which—

Fig. 3 is a diagrammatic side view thereof;

Fig. 4 is a plan thereof; and

Figs. 5 and 6 are, respectively, plan and side elevation of the engine-clutch operating mechanism.

Similar numerals of reference refer to similar parts throughout the several views.

Figure 1:
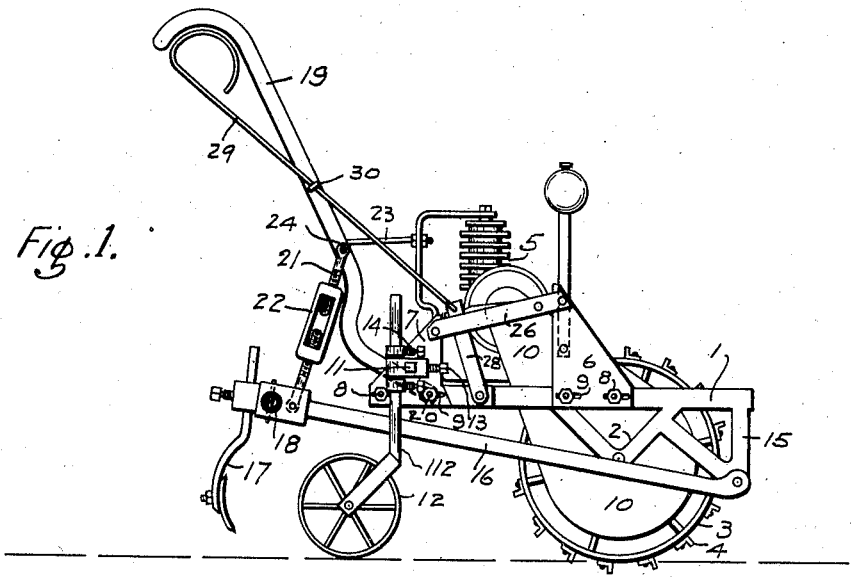
Figs. 1 and 2 are side elevations of the complete tractor showing, respectively, the implements in raised and lowered positions.
Figure 2:
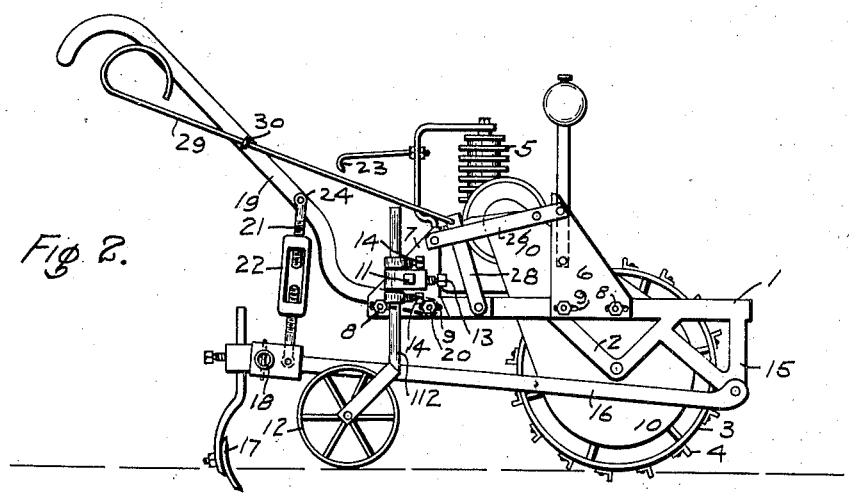

In the operation of small tractors for garden and lawn work it has been found very difficult to produce a machine which is easy to handle and yet which will have sufficient tractive power to pull the tools in some kinds of soil. One reason for this is that it is of prime importance that such a tractor be very light in weight and therefore the tractor wheel will slip in the soil if the tool resistance becomes too great. Further, since these machines have rear idler wheels and since the tools are attached to the machine to the rear of and higher than the axis of the tractor wheels, the drag of the implements pulls down on the rear of the machine, forcing the idlers deep into the soil and decreasing the tractive force available for plowing. It has been my object to increase this tractive force without increasing the weight of the machine and this I have done by applying the drag of the implements at such position on the frame, relatively to the drive wheel and to the weight of the engine, that the dragging force will increase the weight applied to the drive wheel. It has also been a great disadvantage in machines of this class that they have connected the engine direct to the tractor wheel so that it becomes necessary, if the machine is to be moved without running the engine, to crank the engine by hand, with the result that the machine can thus be moved only very slowly. In order to eliminate this practical objection I have introduced a clutch between the engine and the pinion which drives the tractor wheel. A further condition of the machines at present in use is that they have two drive wheels and therefore they can not operate in very rough ground, nor on a side hill, nor in certain plowing conditions because one of the wheels would ride in a furrow. This latter objection I have overcome by providing a single tractor wheel and two idler wheels whereby I can operate my tractor between furrows or on a side hill, in which case I adjust the height of the idler wheels and of the tools so that the machine is maintained in level position in spite of the incline on which it is operated.

Referring now to the drawings, it will be seen that the frame consists of a side bar 1 which is bent in U shape and braced together at various points. This frame has a pair of downward extending brackets 2, one on each side, adapted to receive the bearings of the tractor wheel 3. The wheel 3 is mounted between the two sides 1 of the frame and is positioned near the front thereof. It is provided with suitable cleats 4 to increase its grip on the ground in the usual manner. The frame carries the engine 5 by means of front and rear brackets 6 and 7, respectively, each of which is secured to the frame by bolts 8 passing through slots 9. The brackets 6 and 7 can therefore be adjusted on the frame in order to tighten or loosen the drive chain connecting the engine with the wheel 3 or in order to change the leverage of the engine weight as hereinafter described. Each of these brackets extends across the machine and supports the engine which is bolted to them. The chain which drives the wheel 3 is mounted within a dust-proof casing 10. This casing also encloses the pinion. A clutch mechanism, not shown, is interposed between the engine 5 and the pinion in the casing 10 and this clutch mechanism is operated by means of levers hereinafter described. The engine 5 is mounted to the rear of the traction wheel 3, as clearly shown in the drawings. A square bar or shaft 11 passes through the side legs of the rear bracket 7 and extends out on each side of the machine. This bar 11 carries an idler wheel 12 at each end, such wheel being adjustably secured to the bar 11 by set screws 13. Each wheel 12 is mounted on a vertical bar 112 which is also vertically adjustable relatively to said bar 11 by means of set screws 14. Each vertical bar 112 is mounted to turn freely on its axis so that the idler wheels 12 are swivelled to turn freely thereabout. These two idler wheels 12, together with the tractor wheel 3, form the support for the machine when it is not in use and they form the brace against side tipping of the machine when it is in use. As will be shown later that portion of the weight of the machine which they carry, when not in use, is largely or wholly removed and transferred to the tractor wheel when plowing tools are in action, thus making the machine very easy to guide.

Two brackets 15 extend downwardly from the front of the frame to the ends of which the traction side-bars 16 are pivotally attached. The tool or tools 17 being used are each separately secured to the traction cross-bar 18 in such manner that each tool can be adjusted in plan and in elevation thereon as desired. The cross-bar 18 is fixedly secured to the rear ends of the two traction draw-bars 16 and lies to the rear of the machine frame. Thus it will be seen that the tractive effort necessary to overcome the resistance of the tools 17 in the grounds is applied to the lower end of the brackets 15. The position of the pivots between the brackets 15 and the draw-bars 16 is such that the line of pull of the side-bars comes below the center of the tractor wheel 3; thus it will be understood that this pull tends to turn the frame around the axis of the tractor wheel 3 in such a way as to lift the rear end of the machine and thus take off the weight from the idler wheels 12 and apply it to the tractor wheel 3 and very materially increasing the grip that this wheel has on the ground.

Two handles 19 extend rearward from the machine into convenient position for use by the operator. These handles 19 are each pivoted at 20 to the side frame members 1 and have a limited vertical movement thereon. This movement is limited upwards by the above-mentioned cross-bar 11, which carries the two idler wheels 12, and is limited downward by one of the bolts 8 which brace the frame 1 from side to side and secures the rear engine bracket 7 to the frame. Each of these handles 19 is connected to the rear end of the corresponding draw-bar 16 by means of an adjustable connection such as a rod 21 provided with a turn-buckle 22 as shown in the drawings or any other suitable adjustable means. This adjustable connection between the handles 19 and the cross-bar 18 controls the depth which the tools 17 can pass into the ground. A hook 23 is secured to a part of the engine brace, or other convenient part of the machine, and extends rearward to engage a cross-bolt 24 which braces the two handles 19 together. The length of this hook is such as to engage this cross-bolt 24 when the handles 19 are raised about as far as their upper limit. When the handles 19 are thus raised the lower points of the tools 17 are above the surface of the ground. In this position the machine may be wheeled in any direction either with or without the engine 5 being in operation. When the hook is released from the cross-bolt 24 the tools 17 are dropped and enter the ground until the handles 19 reach their lower limit.

Referring now particularly to Figs. 5 and 6 it will be remembered that the drive pinion is within the casing 10. This pinion has a slight motion by means of which it is thrown into or out of driving connection with the engine 5. When the pinion is pushed towards the engine the clutch is then in operation and the pinion is turned by the engine but when it is not so pushed the clutch is released and the pinion no longer turns with the engine. In order to control the position of the pinion I provide a lever 25 which engages the pinion shaft and which is pivoted at one end to a side-piece 26 attached to the sides of the front and rear engine brackets 6 and 7. The position of this pivot is adjusted by screwing in or out the nuts 27 on the pivot bolt. The free end of the lever 25 is formed so as to be wider than the main portion thereof. A second lever 28 is pivoted to the side frame member 1 and extends up between the above-mentioned side-piece 26 and the lever 25. A hand rod 29 passes from near the free end of the handle 19, through a loose support 30 on the handle, to the upper end of the lever 28 so that, by pulling on the end of the rod 29, the lever 28 is pulled to engage the widened end of the clutch lever 25 thus throwing the clutch into action.

Similarly if the rod is pushed, the lever 28 is removed from the widened part of the clutch lever 25 and the pinion is freed from the clutch.

Having described my invention, what I claim is:—

1. In a hand-guided garden cultivator, the combination of a traction wheel, a frame supported intermediate its ends on the traction wheel, an engine mounted on the frame rearwardly of the traction wheel axis and operatively connected with said wheel, a bracket depending from the forward part of said frame, a soil-engaging tool disposed rearwardly of the traction wheel axis, and a drawbar extending below the traction wheel axis and connecting the tool with the bracket at a point forwardly of said axis whereby drag of the tool in the ground tends to throw the weight of said engine on the traction wheel and increase its tractive effort.

2. In a hand-guided garden cultivator, the combination of a traction wheel, a frame supported intermediate its ends on said wheel, an engine mounted on the frame rearwardly of the traction wheel axis and operatively connected with said wheel, a bracket depending from the forward part of said frame, a soil-engaging tool disposed rearwardly of the traction wheel axis, a drawbar extending below the traction wheel axis and connecting said tool with the bracket at a point forwardly of said axis whereby drag of the tool in the ground tends to throw the engine weight on the traction wheel and increase its tractive effort, and means for moving the engine toward and from the tractor wheel.

3. In a hand-guided garden cultivator, the combination of a traction wheel, a frame supported intermediate its ends on the wheel, an engine mounted on the frame rearwardly of the traction wheel axis and operatively connected with said wheel, a bracket depending from the forward part of said frame, a soil-engaging tool disposed rearwardly of the traction wheel axis, means supporting said tool from the frame and providing for relative vertical movement therebetween, and a drawbar extending below the traction wheel axis and connecting the tool with the depending bracket at a point forwardly of said axis whereby drag of the tool in the ground tends to throw the engine weight on the traction wheel and increase its tractive effect.

4. In a hand-guided garden cultivator, the combination of a traction wheel, a frame supported intermediate its ends on the wheel, an engine mounted on the frame rearwardly of the traction wheel and operatively connected with the latter, a bracket depending from the frame forwardly of said wheel, a soil-engaging tool disposed rearwardly of the engine, adjustable means supporting the tool from said frame for regulating the depth of the tool in the ground, and a drawbar extending below the traction wheel axis and connecting said tool with the depending bracket whereby drag of the tool in the ground tends to throw the engine and frame weight on the traction wheel and increase its tractive effect.

5. In a hand-guided garden cultivator, a frame, a traction wheel journalled on the frame near the forward end thereof, an idler wheel normally supporting the frame at the rear thereof, an engine mounted on said frame between the wheel axes and operatively connected with said traction wheel, a soil-engaging tool, and a drawbar extending below the traction wheel axis and connecting said tool with the frame at a point forwardly of said axis whereby drag of the tool in the ground tends to transfer the engine weight on the idler wheel to the traction wheel and increase its tractive effect.

6. In a hand-guided garden cultivator, a frame, a traction wheel journalled on the frame near the forward end thereof, an idler wheel normally supporting the frame at the rear thereof, an engine mounted on said frame between the wheel axes and operatively connected with said traction wheel, a soil-engaging tool, a drawbar extending below the traction wheel axis and connecting said tool with the frame at a point forwardly of said axis whereby drag of the tool in the ground tends to transfer the engine weight on the idler wheel to the traction wheel and increase the tractive effort, and means for moving the engine toward and from the tractor wheel.

7. In a hand-guided garden cultivator, a frame, a traction wheel journalled on the frame near the forward end thereof, an idler wheel normally supporting the frame at the rear thereof, an engine mounted on said frame between the wheel axes and operatively connected with the traction wheel, a bracket depending from the forward part of the frame, a soil-engaging tool disposed rearwardly of the traction wheel, and a drawbar extending below the traction wheel axis and connecting the tool with the depending bracket at a point forwardly of said axis whereby drag of the tool in the ground tends to transfer the engine weight on the idler wheel to the traction wheel.

8. In a hand-guided garden cultivator, a frame, a traction wheel journalled in said frame near the forward end thereof, idler wheels at the sides of the frame and supporting the same at the rear thereof, an engine mounted on the frame between the idler and traction wheel axes, a soil-engaging tool disposed rearwardly of the traction wheel, and a drawbar extending below the traction wheel axis and connecting the tool with the frame forwardly of said axis whereby drag of the tool in the ground tends to transfer the engine weight on said idler wheels to the traction wheel.

9. In a hand-guided garden cultivator, a frame, a traction wheel journalled in said frame near the forward end thereof, a pair of idler wheels one adjacent each side of said frame and normally supporting the same at the rear thereof, an engine mounted on the frame between the idler and traction wheel axes and operatively connected with said traction wheel, a bracket depending from the frame forwardly of the traction wheel axis, a soil-engaging tool disposed rearwardly of said axis, and a drawbar extending below the traction wheel axis and connecting said tool with the depending bracket whereby drag of the tool in the ground tends to transfer the frame and engine weight on the idler wheels to the traction wheel.

10. In a hand-guided garden cultivator, a frame, a traction wheel journalled in the frame near the forward end thereof, a pair of idler wheels one adjacent each side of the frame and normally supporting the same at the rear thereof, an engine mounted on the frame between the idler and traction wheel axes and operatively connected with said traction wheel, a bracket depending from the frame forwardly of the traction wheel axis, a soil-engaging tool disposed rearwardly of the idler wheel axis, means connecting said frame with the tool for raising and lowering the latter, and a drawbar extending below the traction wheel axis and connecting the tool with said depending bracket.

WALTER U. SMITH.